N. G. SÖRENSEN.
POST CARRYING CROSSED THREADS FOR THE SUPPORTING OF CROP OR PLANTS.
APPLICATION FILED DEC. 21, 1915.
1,225,281.
Patented May 8, 1917.
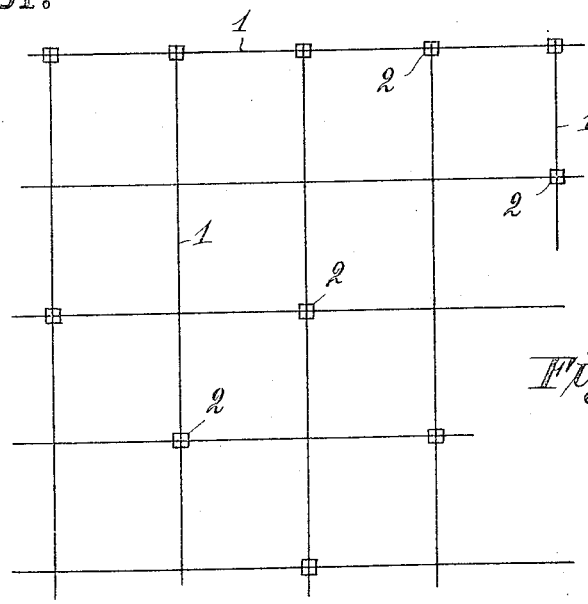
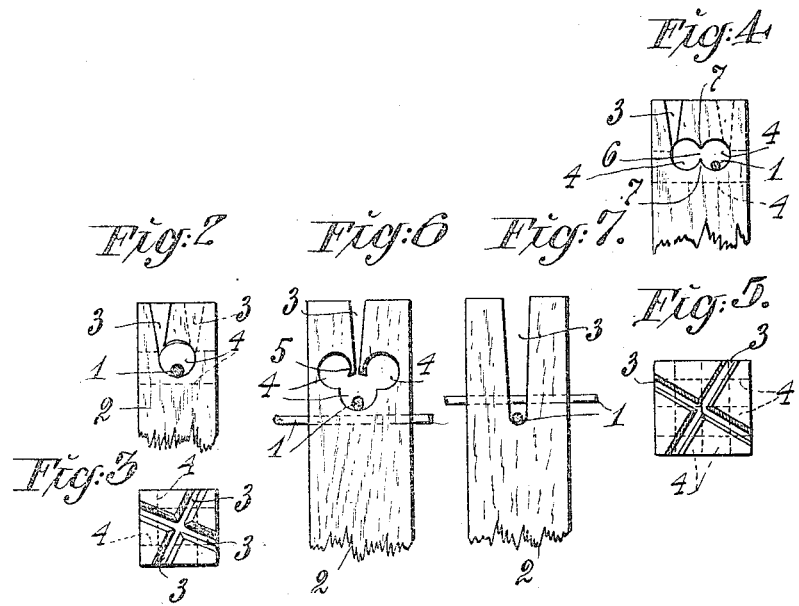
Inventor:-

UNITED STATES PATENT OFFICE.

NIELS GEORG SÖRENSEN, OF STOCKHOLM, SWEDEN.

POST CARRYING CROSSED THREADS FOR THE SUPPORTING OF CROP OR PLANTS.

1,225,281.     Specification of Letters Patent.     Patented May 8, 1917.

Application filed December 21, 1915. Serial No. 68,062.

*To all whom it may concern:*

Be it known that I, NIELS GEORG SÖRENSEN, a subject of the King of Sweden, and resident of Blasieholmstorg 11, Stockholm, in the Kingdom of Sweden, have invented certain new and useful Improvements in Posts Carrying Crossed Threads for the Supporting of Crop or Plants, of which the following is a specification, reference being had therein to the accompanying drawing.

In order to avoid losses suffered by farmers by the crop being thrown or weighed down by storm, hails or rain, it has been proposed, previously, to provide over the field, before the growing up of the crop, crossed threads under tension and located at suitable distance from the ground, between which the crop then grows up and by which it is supported and thus prevented from lodging. The means proposed for the said purpose, however, have been too expensive and the mounting of the same too laborious, for which reasons the said means have not been so generally used and have not been followed by such a profit as desired.

This invention relates to the providing for crop, for instance rye or wheat, smooth threads on posts and forming suitably large squares, the sides of which have a length of for instance 1.5 meter, and for the said purpose to use posts or sticks made of wood and preferably having no mountings of any kind such as loops, hooks or the like, which make the means more expensive and the transportation of the same more troublesome. By using perfectly smooth posts or sticks, in the top ends of which grooves or slots or openings of special shape or both grooves, etc., and openings are provided simultaneously it will be possible to manufacture the supporting means in a cheap and wholesale manner, so that they may be bought by farmers and will be commonly used and guarantee to the users a greater security against unfavorable weather and render the harvesting operation easier. The said threads or ropes may consist of wires, preferably galvanized, and of the slightest possible diameter, or they may be made of vegetable fibers of the general kinds.

In the accompanying drawing some posts arranged in accordance with this invention are shown as examples. The said drawing also illustrates the manner in which they are intended to be placed.

Figure 1 shows in a plan view threads 1 forming squares and supported by posts 2 put down into the ground at the cross points of the threads. A post need not necessarily be provided at every cross point of the said threads. The number of posts will be dependent on the dimensions of the squares and experience acquired while using the supporting means may serve as a guidance for the locating of the posts. Fig. 2 represents a side elevation, and Fig. 3 a plan view of a portion of a post with my invention incorporated.

The post 2 is pointed at its lower end and is provided at its top end with slots 3 opening into holes 4 which run transversely through said post and have a diameter greater than the bottom of the slots 3. The slots 3 have an oblique direction with relation to the holes 4, so that pressure in a vertical direction may not cause the thread to leave the holes. This arrangement is particularly suitable for fields which are hollow or convex in form where the threads would naturally be subject to tension in a vertical direction.

In the arrangement shown in Figs. 4 and 5, showing a side view and a plan view respectively, two transverse holes 4 are provided in the post for each slot 3, the said slot having an oblique direction with relation to the said holes. The holes 4, 4, communicate with one another in such manner that there is a narrow opening 6 between the holes through which the thread 1 can pass. The arrangement shown in Figs. 4 and 5 operates in the same manner as the arrangement shown in Figs. 2 and 3. The ridges 7 between the holes 4 will prevent the thread 1 to a certain degree from passing from the hole in which it has been mounted, into the other hole and thus assists in preventing the thread from leaving the combined opening 4—4 upward.

In the arrangement shown in Figs. 6 and 7, three holes 4 communicating with each other, are bored in the post below the slot 3, which holes are located in the corners of a triangle having one of its points directed downward. The said holes are so located that downwardly extending narrow parts 5 are provided between the two upper holes, through which parts 5 extends the slot 3, which is narrower than the thread 1, or, it may be, ends in a longitudinal chap in the wood. The post may be provided with holes of the type just described extending from both sides of the post or, as shown in Figs. 6 and 7, with only one set of holes and with a slot of the type stated above and so deep that it extends below the bottom of the lowermost hole located in the corners of the said triangle. Owing to the described arrangement the thread put into the post through the slot 3 and between the parts 5, is held in its position and is prevented when withdrawn longitudinally, from becoming clamped, owing to the fact that the elasticity of the wood of the parts 5 permits the thread to be put down into the opening but prevents the thread from leaving the same upward or from becoming jammed. For the manufacturing of the posts shown in Figs. 6 and 7, a suitable kind of wood must be used; for instance, fir or alder, so that the fibers of the parts 5 will extend longitudinally of the same. If one of the threads is mounted in the elongated slot 3 before the other thread is mounted in the hole 4, the latter will keep the thread located in the slot 3, in its position. The form of the hole 4 may evidently be varied, provided only that the hole has an elastic entrance part of the described type.

For the providing of the net over the field the threads are mounted on the same and the posts put into the ground at suitable cross points, the threads being then put into the slots or holes of the posts and the ends of the threads fixed to suitable posts located at the edges of the field or the section covered by the net. The height of the posts is preferably so adapted, that the net is located about fifty or one hundred centimeters above the ground. For other plant-species than crop other suitable dimensions are used. During the harvesting operation one need not tread on the field for the removing of the threads from the same, as the threads may be drawn through the posts outward toward the sides of the field. If the distance between the rows of posts is equal to the width of the cutting device of the reaping-machine the posts may be uncovered and removed row by row according as the said machine is advanced.

What I claim is:

1. A post for carrying crossed threads for the support of crops or plants, said post being provided at its upper end with crossed slots of different depths and transverse holes of greater diameter than the bottoms of said slots communicating with the bottoms of said slots respectively, the shallower slot having an oblique direction with respect to the hole with which it communicates.

2. A post for carrying crossed threads for the support of crops or plants, said post being provided at its upper end with crossed slots of different depths and transverse holes of greater diameter than the bottoms of said slots communicating with the bottoms of said slots respectively, each slot having an oblique direction with respect to the hole with which it communicates.

3. A post for carrying crossed threads for the support of crops or plants, said post being provided at its upper end with crossed slots of different depths and two adjacent transverse holes each of greater diameter than the bottoms of the said slots communicating with each other through a narrow opening and with the bottoms of said slots respectively, each slot having an oblique direction with respect to the two adjacent holes.

4. A post for carrying crossed threads for the support of crops or plants, the said post being provided at its upper end with crossed slots of different depths and transverse holes of greater diameter than the bottoms of said slots communicating with one of the said slots through a restricted opening provided between two of three adjacent holes placed in a triangle and communicating with each other through narrow openings.

In witness whereof, I have hereunto signed my name.

NIELS GEORG SÖRENSEN.

Copies of this patent may be obtained for five cents each, by addressing the "Commissioner of Patents, Washington, D. C."